May 17, 1927.
A. DE CHANGY
1,628,710
STARTING GEAR FOR FIXED EXPLOSIVE MOTOR ENGINES AND MOTOR VEHICLES
Original Filed July 24, 1923   2 Sheets-Sheet 1
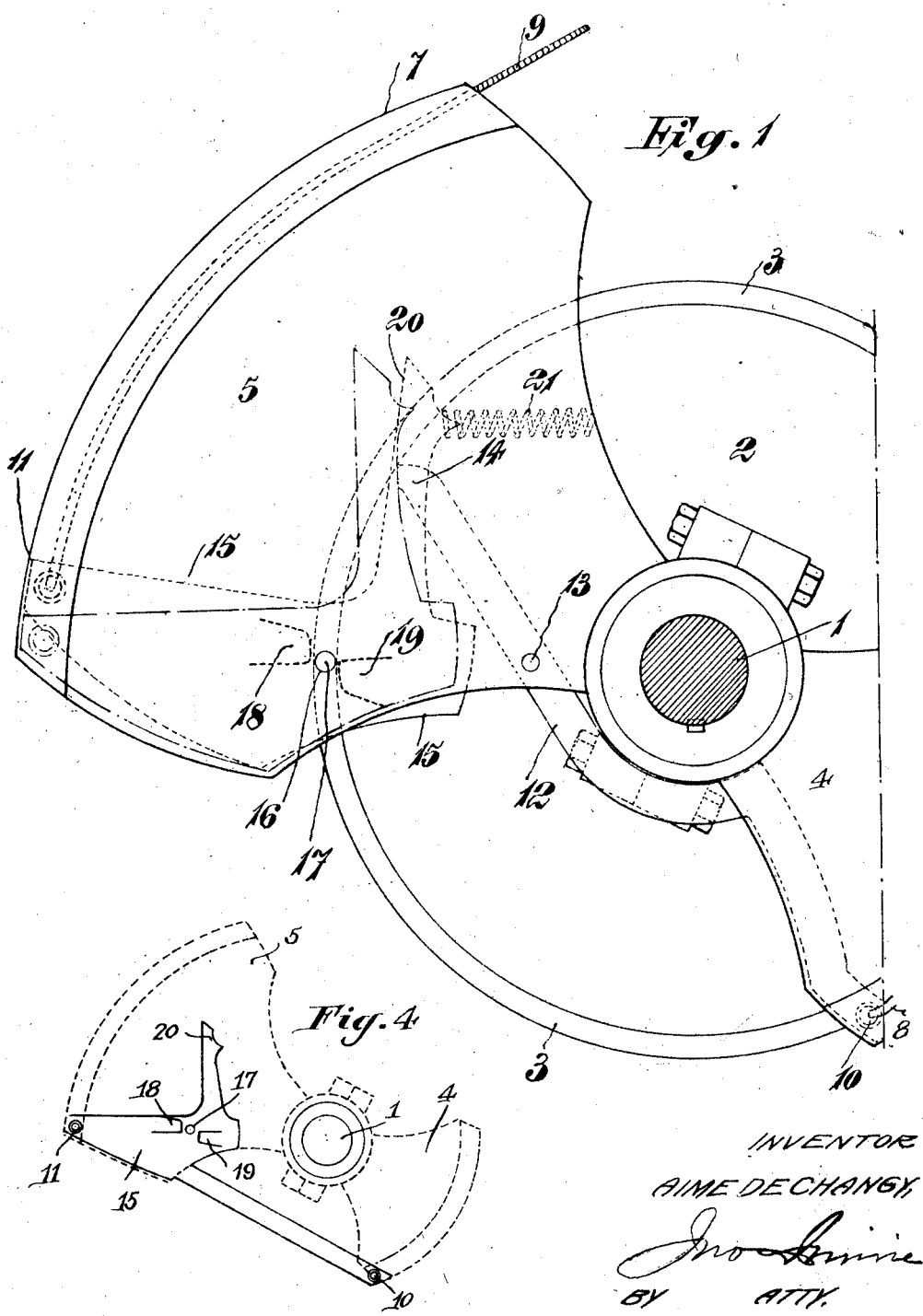
INVENTOR
AIME DE CHANGY,
BY  ATTY.

May 17, 1927.
A. DE CHANGY
1,628,710
STARTING GEAR FOR FIXED EXPLOSIVE MOTOR ENGINES AND MOTOR VEHICLES
Original Filed July 24, 1923    2 Sheets-Sheet 2
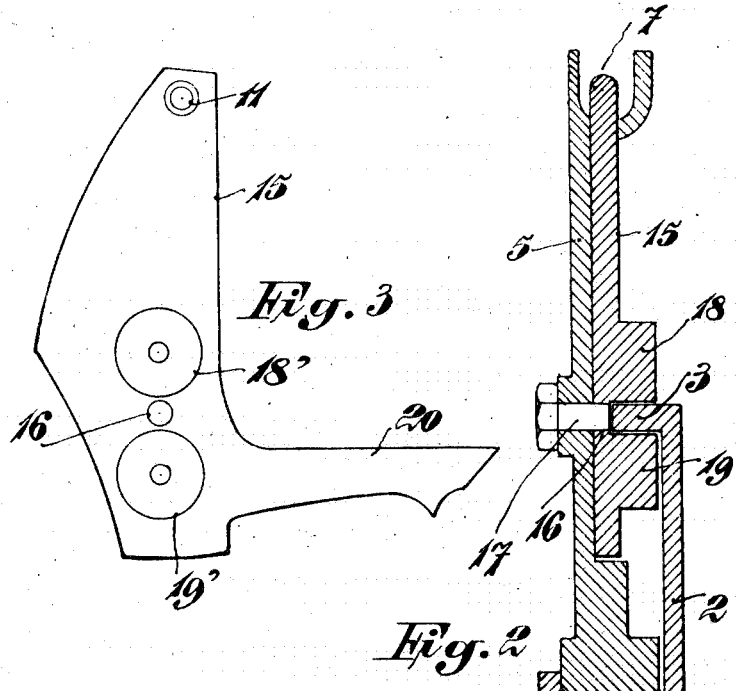
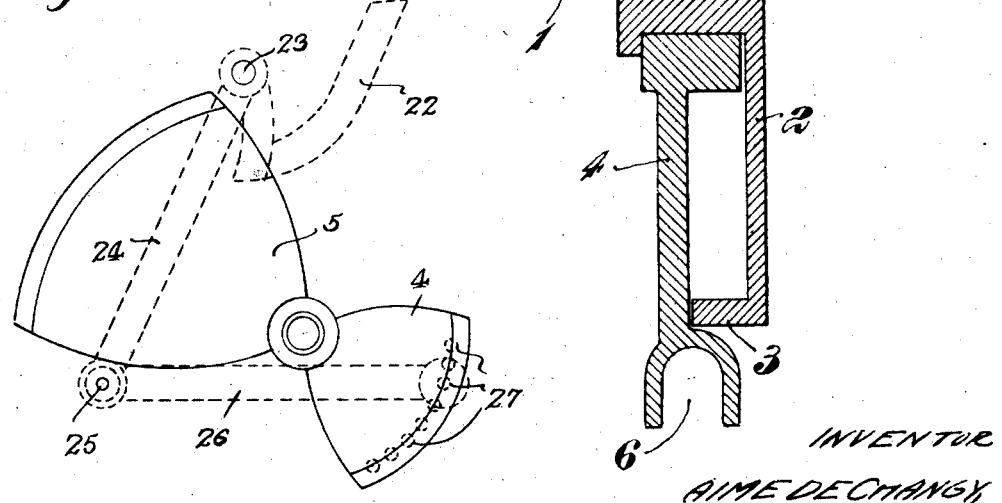
INVENTOR
AIME DE CHANGY
BY ATTY Patented May 17, 1927.

1,628,710

UNITED STATES PATENT OFFICE.

AIMÉ DE CHANGY, OF EPINAY, FRANCE.

STARTING GEAR FOR FIXED EXPLOSIVE MOTOR ENGINES AND MOTOR VEHICLES.

Application filed July 24, 1923, Serial No. 653,599½, and in France July 25, 1922. Renewed April 5, 1927.

My invention relates to mechanical starting gears for motors wherein through the use of treadles, levers, rods and cables arranged to be actuated by the driver from his seat, the motor may be started without requiring the use of a crank or the usual electric servo-motor.

This invention hereinafter described with full particulars with reference to the accompanying drawings shows diagrammatically and by way of example a mode of carrying into practice the said device with a few modifications in the driving gear.

Fig. 1 is a view in elevation of the improved mechanical gear the right end portion being partly broken away.

Fig. 2 is a vertical sectional view through the same.

Fig. 3 shows a feeder with two locking rollers.

Fig. 4 shows as one part the lever and channels, the feeder and the releasing finger.

Fig. 5 shows in side elevation the channelled lever with the connecting rods actuated by a treadle.

In these drawings 1 is the motor shaft required to be started and set in motion, 2 is a hub plate keyed upon the shaft and carrying a cylindrical flange 3 serving as a locking surface feeder device.

A lever 4 and an eccentric lever 5 each provided with channels as 6, and 7, rock freely upon the hub plate sleeve or directly upon the shaft 1 and are actuated by chains or cables 8, and 9, operated from the driver's seat by the aid of suitable mechanical means. Cable 8 is fixed to the releasing finger 12 at 10 and cable 9 to the feeder 15 at 11.

The releasing finger 12 rocks upon the axis 13 of the locking and starting lever 5 and its free end 14 bears upon the feeder in order to release it.

The feeder 15 rocks at 16 upon the axis 17 of the lever or cam 5 and is furnished with two projections 18—19 which act as locking means against the inner and outer surfaces of the cylinder 3 and thus impart a starting motion to the shaft 1.

The feeder may be provided at one of its ends with an arm 20 upon which the releasing finger 12 acts and which is pressed by a spring 21 to facilitate the release and prevent any undue locking.

The locking projections 18—19 may be replaced by cylindrical bosses 18¹—19¹ Fig. 3 to facilitate the release.

By pulling the cable 9, the feeder 15 is made to rock about the axis 17 and hence the projections 18—19 to bear upon the inner and outer surfaces of the cylinder 3 so as to start the shaft and set it in rotation. But if on the contrary the cable 8 is pulled, the releasing finger 12 is made to rock about the axis 13 and hence the releasing finger end 14 to bear upon the arm 20 of the feeder and release the locking projections 18—19 thus freeing the cylinder 3.

In some cases the releasing finger may act conjointly with the feeder and may be replaced by a member 15″ rocking about the shaft 17 and operated by the cables 8 and 9 at 10 and 11 (Fig. 4).

In other cases it may be advisable to operate with the treadle and levers as shown in Fig. 5 where the levers 4—5 provided with a cable, a feeder, and a releasing member 12 are similar to that shown in Figs. 1 and 2.

The starting device for motors is carried out by the treadle 22 rocking about the axis 23 in connection with the rod 24 jointed at 25 to another rod 26 fixed on one of the rocking parts 27 of the disconnecting lever or cam 4, such treadle being shifted a few degrees for each fixing point of the said lever 4, according to requirements.

The rod 26 connected to the brake or foot actuated treadle 22 or the brake being pulled by hand contrariwise to the braking action will reverse the whole device while moving the cylinder 3 which is immediately locked between the projections 18—19 of the feeder 15 and causing the motor to rotate.

The practical displacement of the device is 210° but it may increase and reach 235° with a straight connecting rod and over 265° with a curved rod as far as the dead centre of the rod and lever.

In practice and taking into account the enormous power developed by the length of the brake lever or of any lever or treadle compared with a crank not only can 210° be obtained—corresponding to the passage of the compression of the two cylinders of a four cycle motor keyed at 90°; or of three cylinders keyed at 60° of a six cylinder motor or of four cylinders keyed at 45° of an eight cylinder motor—but one turn and a half of the motor while taking into account the throw due to the length of the arm used.

The starting device which is the object of this invention has many advantages over electric starting gears and considering its more rapid revolution it causes the lighting magneto to have a more powerful and warmer spark which effects an immediate ignition of the compressed gases.

It may also be remarked that the device is return-proof and hence cannot cause any accident, the feeder's release being automatic owing to the action of the spring and of the safety releasing finger.

I claim:

1. In a mechanical starter for explosive engines, having a shaft, a flanged hub plate carried on the shaft, a lever mounted on the hub plate and having a concentric portion and an eccentric portion, a feeder pivotally supported on the eccentric portion and having lugs to bear on the opposite sides of the flange of the hub plate and to grip said flange in the operation of the feeder, and a releasing finger to release the feeder at will.

2. In a mechanical starter for explosive engines, having a shaft, a flanged hub plate carried on the shaft, a lever mounted on the hub plate and having a concentric portion and an eccentric portion, a feeder pivotally supported on the eccentric portion and having lugs to bear on the opposite sides of the flange of the hub plate and to grip said flange in the operation of the feeder, a releasing finger to release the feeder at will, and means connected to the feeder and to the releasing finger for operation of these parts.

In testimony whereof I affix my signature.

AIMÉ de CHANGY.